United States Patent [19]

Elsea, Jr. et al.

[11] 4,359,324

[45] Nov. 16, 1982

[54] DIESEL ENGINE FUEL COMPOSITION AND USE OF SAME FOR OPERATING DIESEL ENGINES

[76] Inventors: Hugh R. Elsea, Jr., Rte. 3, Box 149, Troutville, Va. 24175; Lionel L. Etheridge, 956 Stonegate Dr., Salem, Va. 24153

[21] Appl. No.: 248,445

[22] Filed: Mar. 27, 1981

[51] Int. Cl.³ ............................................. C10L 1/18
[52] U.S. Cl. ........................................ 44/53; 44/57; 44/66
[58] Field of Search .................... 44/53, 57, 66, 55

[56] References Cited

U.S. PATENT DOCUMENTS 1,420,622  6/1922  Charbonneaux ..................... 44/55
2,117,609  5/1938  Jean ..................................... 44/53

FOREIGN PATENT DOCUMENTS 132270  11/1946  Australia ............................... 44/53

OTHER PUBLICATIONS

"Vegetable Oil as Diesel Fuel?," J. Am. Oil Chemists Soc., 57, 805-A-811A, 819-A-816A (Nov. 1980).
Chemical and Engineering News, "Fuel from Sunflowers" vol. 70, Sep. 7, 1981.

*Primary Examiner*—Jacqueline V. Howard
*Attorney, Agent, or Firm*—Mason, Fenwick & Lawrence

[57] ABSTRACT

A diesel engine fuel consisting essentially of about 25-75% of a butyl alcohol and about 75-25% of a vegetable oil which is normally liquid under operating conditions, both percentages being by volume, constitutes a clean burning, smooth running fuel composition for diesel engines that delivers engine speed and power substantially equal to that of No. 2 diesel oil but burns with less perceptible exhaust smoke and odor, starts easily without external ignition aids at temperatures at least as low as about 14° F., and is compatible in all proportions with No. 2 diesel oil.

6 Claims, No Drawings

DIESEL ENGINE FUEL COMPOSITION AND USE OF SAME FOR OPERATING DIESEL ENGINES

FIELD OF THE INVENTION

This invention relates to a diesel engine fuel composition and to the use of such composition as the essential fuel for diesel engines and is concerned more especially with a diesel fuel composition that can be derived, at least in large part, from natural renewable sources.

BACKGROUND OF THE INVENTION

With rapidly escalating prices in the past decade or fuels derived from petroleum and the ultimate prospect of increasingly dwindling reserves of crude oil from which such fuels can be derived, a pressing need exists for the development of alternative fuels that can be produced at least to a large extent, and preferably in entirety, from non-petroleum sources. Serious attention is being given to the derivation of comparable fuels from coals and like solid fossil fuels but such derivation, at the present state of the art, can only be achieved by relatively complex chemical processing requiring enormous amounts of capital investment, and while the projected reserves of coal are larger than those of crude oil, they too are inherently limited from an ultimate viewpoint.

Proposals have already been made for the utilization of alcohols, particularly ethyl alcohol, as a fuel for internal combustion engines of the type powered by gasoline or the like and limited proportions of gasoline can indeed be replaced by ethyl alcohol without material loss of performance or engine modification as it is now established, e.g. in Brazil, that such engines can be powered by alcohol fuels alone if the engine is properly modified and subject to some loss of performance. In the case of diesel engines, however, which are normally fueled by No. 2 diesel oil obtained from crude oil and its distillates, conversion to a fuel based in whole or in part on alcohols, especially ethyl alcohol, presents substantially greater difficulties inasmuch as the alcohol apparently lacks the lubricating characteristics required by diesel engines and is also subject to ignition behavior not well suited for diesel engine operation. Proposals have recently been made in U.S. Pat. Nos. 4,177,768; 4,185,594; 4,198,931; 4,204,481 and 4,208,190 for formulating a diesel fuel based essentially on one or more alcohols within the range of $C_{1-5}$ by incorporating therein an organic nitrite compound to accelerate the ignition behavior of these liquids together with one or more of selected organic long chain fatty acids or derivatives thereof as lubricant additives but compositions of this type have not yet come into sufficiently widespread use as to permit their evaluation as to the long term effect on the engine itself or the possible consequences of such use upon the environment. Moreover, serious questions continue to be raised by knowledgeable observers if alcohols can be produced in an acceptably economical way in the enormous quantities that would be needed to replace large amounts of petroleum-based fuels for vehicles.

Natural oils such as those obtained from growing plants, usually referred to as vegetable oils, which can be obtained in large quantities relatively easily by mass or even small scale production, have a natural lubrication quality but have not, insofar as we are aware, been seriously proposed for use as a fuel for diesel engines. Traditionally, diesel engines have been reputed to have the capability of operating from virtually any combustible material as fuel, but this assessment should undoubtedly be considered to be more metaphorical than real when viewed in a practical light.

It has been proposed at comparatively dates in U.S. Pat. Nos. 2,117,609; 2,117,610 and 2,179,151 to obtain a fuel composition from natural non-petroleum or non-coal sources which was constituted approximately ⅓ of butyl alcohol, ⅓ of acetone and ⅓ of other volatile ingredients such as diethyl ether or ethyl alcohol with a small percentage, say 5–7%, of corn oil, but such fuels were clearly formulated for combustion in spark-ignited engines as a substitute for gasoline and would not be conceivably appropriate for powering diesel engines.

In addition, it is our belief that a diesel engine could be fueled acceptably by a vegetable oil alone only with some adjustment or modification of the engine, including a fuel injector opening of special size. Also, the caloric or BTU content of vegetable oil appears to be significantly inferior to that of No. 2 diesel oil and the operation of the diesel engine with an all vegetable oil fuel would be expected to result in a significant loss of performance, especially power output.

We have attempted to improve the characteristics of vegetable oil by admixing therewith ethyl alcohol, but ethyl alcohol has very poor compatibility with vegetable oils that could be overcome only by the incorporation of disproportionately large amounts of a detergent. For example, we were able to produce a resonably stable mixture containing about 50% ethyl alcohol, about 12½% vegetable oil and 37½% of a detergent such as Polytergent B-300, a nonionic nonyl phenol polyethylene oxide adduct marketed commercially by Olin Chemical Company, but when the portion of detergent was reduced from this inordinate level, immediate separation of the oil and alcohol occurred. The necessity for the inclusion of a synthetic detergent in quantities of this order is prohibitive from a cost standpoint.

We have now discovered that mixtures of a vegetable oil in the range of about 25–75% and a butyl alcohol in the range of about 75–25%, both percentages being by volume, result in homogeneous blends that can be burned effectively in diesel engines with only an insignificant reduction in output horsepower and with a slight but not significant increase in no load engine operating speed. In addition, these vegetable oil-butanol mixtures are fully compatible with No. 2 diesel oil, do not separate or segregate even on standing for periods of many months, burn smoothly in the engine with an actual decrease in engine operating noise, emit no visible exhaust, in contrast to No. 2 diesel fuel and have instead of the somewhat unpleasant acrid odor of conventional oil, a rather pleasant odor reminiscent of an outdoor barbecue. These fuels undergo prompt ignition without the assistance of a glow plug or other external ignition device at ambient temperatures as low so far as 14° F., and repeated cranking is not necessary. Provided that the vegetable oil is reasonably free of suspended matter, the blends of the present invention are clean, have no tendency to cause clogging of the engine filters, but in actual fact appear to exert a cleansing action upon such filters when substituted for conventional diesel oil.

Insofar as can be determined, virtually any of the recognized vegetable oils can be employed in the present fuel compositions. We have used corn oil, sunflower seen oil, peanut oil, soybean oil, linseed oil, cottonseed oil, separately and in any combination in any proportion. Thus, the present compositions offer the happy prospect of the make-up of the vegetable oil component being adjusted as needed to suit the availability of particular oils according to the growing conditions within a given area or changing market conditions. That is to say, if the growing conditions for a particular kind of vegetable oil were less favorable, or if a surplus developed of another oil, one oil could simply be replaced by a different oil which was more readily available at a given time and under a particular combination of conditions. It is obviously necessary that the vegetable oil component remain liquid under the full spectrum of engine operating conditions, especially ambient temperature, or alternatively be fully soluble in the butanol component over such temperature range. It is known, of course, from other fields to subject certain vegetable oils, notably cottonseed oil, to controlled chilling, called "winterizing," in order to selectively solidify certain low melting components that might otherwise appear in suspension when subjected to cold temperatures, and these techniques can certainly be applied to the vegetable oils of the present invention if need be. Other vegetable or plant oils than those named in the preceding list might very well be equally useful for the purposes of this invention, such as olive oil, tung oil or the like, but these oils are of such exotic character and limited availability in most areas of the world that they would hardly be practical substitutions. Where available at acceptable cost, however, their utilization might well be desirable.

The vegetable oils of the present invention are common commercial products in the marketplace, and their production requires no detailed explanation here. In general, they are derived from the seeds of various plants, the seeds being harvested either for the direct use, e.g. peanuts, or secondarily to a primary plant component, e.g. cottonseed, the plants of which are planted and cultivated in the usual manner. The harvested seeds contain varying content of oil, according to their character, ranging for example from about 20% in the case of cottonseed oil and soybean oil to about 45-50% in the case of peanut oil and corn oil. The oil is typically obtained by a cold pressing operation in which the seeds are crushed and then placed under heavy pressure at normal temperatures whereby the oil is expressed from the seeds and collected. It is known that the oil can be extracted by solvent treatment, but this is less preferable due to the cost of the solvent and the need for solvent recovery and reuse. In some cases, the crude oil appears to be useful in the invention without further purification or refinement, an example being crude soybean oil. In other cases, the commercially available crude oil contains an undesirable content of solid matter which forms a sediment that is undesirable here. The latter type of oil, for example, corn oil, should of course be purified or refined to remove this sediment before use in the invention. While the oils in question are at the present time ordinarily produced commercially in large scale industrial facilities, utilizing heavy duty equipment, and can certainly be purchased from these sources, it will be apparent that the possibility exists for the oils to be derived directly by means of relatively simple equipment which could be purchased or constructed and operated by an actual individual producer or a group of actual producers within a common neighborhood and thereby become independent of a complex marketing structure.

While the specific vegetable oils identified above are those most commonly available within the U.S., the invention should not be considered as limited in principle to these oils. In other parts of the world, other types of oils may be more readily available, such as palm oil, coconut oil, castor oil, rapeseed oil, sesame seed oil and possibly tung oil and olive oil and could undoubtedly be substituted with more or less equivalent performance. Thus, the present invention has the advantage of adaptability to whatever kinds of vegetable oils that might be readily available at an acceptable cost in a particular area in which it may be practiced.

As regards the butyl alcohols, we have successfully used both normal and secondary butyl alcohol without any observable difference in engine operating characteristics or performance. We would expect iso-butyl alcohol to perform equally well inasmuch as its physical characteristics are more comparable to normal butanol than are those of secondary butanol to normal butanol. Tertiary butyl alcohol has a melting point of about 26° C. and would consequently exist in solid form at temperatures below that point. It would, therefore, be less suitable even if its cost were comparable with other butyl alcohols.

The alcohols in question are presently produced in commercial quantities mainly by synthetic processes; however, they were produced on a large scale basis several decades ago by means of an anaerobic fermentation process using special strains of saccharolytic acetone-butyl alcohol bacteria principally of the genus Clostridium. The original strains of these bacteria were effective to convert cornstarch and the like but additional strains were developed having the capacity of converting molasses and, indeed, virtually any saccharitic raw material, such as beet or citrus molasses, sulfite waste liquors as a by-product of paper pulping, etc. The product of the butyl alcohol fermentation and distillation process is a mixture of about 60-80% butyl alcohol, about 20-35% acetone, and a minor amount of ethyl alcohol and/or isopropyl alcohol, the relative proportions of which within these ranges depending upon the choice of the particular bacterial strain, the type of raw material selected for fermentation, and the concentration of saccharides present therein, etc. Further details concerning the butyl alcohol fermentation process can be found in *The Source Book of Industrial Solvents*, Vol. 3, Reinhold Publishing Co., copyright 1959, pages 163–185 and *Industrial Chemistry* by Kent, Reinhold Book Corp, copyright 1962, pages 188 et seq. and references cited therein.

In principle, the butyl alcohol fermentation is similar to common ethyl alcohol fermentation, especially as regards process equipment, the principal difference being only the bacterial strain. Thus, the possibility also exists with respect to the butyl alcohol component for independent localized production by an actual individual producer or a collective of actual producers, although large scale commercial production is an equal option having the possible economic advantage of large scale operation.

While the production of the butyl alcohol component from naturally grown by-products, as indicated above, is deemed preferable from the standpoint of total independence from crude oil, coal and the like fossil fuels of inherently limited natural availability, the invention is obviously not intended to be limited to any particular source for the butyl alcohol, and the butyl alcohol can consequently be obtained by synthetic chemical processes if such be desirable and economically competitive. Butyl alcohols can be made synthetically from acetaldehyde obtained by the hydration of acetylene or the oxidation of ethyl alcohol, the acetaldehyde being condensed to actaldol which is then hydrated to crotonaldehyde which is hydrogenated to n-butyl alcohol. Alternatively, butyl alcohol can be synthesized from olefins, such as propylene. Significant amounts of liquid hydrocarbons are obtained as by-products in the production of natural gases, and these by-products may lend themselves effectively to the production of the butyl alcohol component of the invention on an economic basis.

The above specified range of proportions of the vegetable oil and butyl alcohol does not have critical limits, the limits which are indicated being rather determined on the basis of what has been found to work well in practice and achieve all of the objectives of the invention to maximum degree. Thus, while the above range is normally preferable, the limits thereof can be exceeded in either direction, although this is typically accompanied by a decrease in engine rpm to the range of about 3200-3400 as contrasted with the optimum range of 3700-3800 rpm using the preferred blends. Within the stated range, 50—50 blends are most preferred.

The butyl alcohols are characterized by a caloric content, measured as the hat of combustion, which is virtually twice that of ethyl alcohol and are consequently superior to ethyl alcohol as a fuel component not only from the standpoint of compatibility with vegetable oils, but from the standpoint of actual heat output during combustion within the engine. Vegetable oils themselves have high caloric content, the heat of combustion of oleic acid, a major constituent in most cases, being for example substantially higher than n-octane. Thus, the blends of the invention are well adapted for use as fuels in the operation of diesel engines on the basis of their energy content alone irrespective of their other desirable properties.

Calculation of the caloric or BTU content of the fuel blends of the present invention results in values slightly lower than No. 2 diesel oil, which explains the slight loss in horsepower output observed in Example 17 of the following samples, and the difference in BTU content varies slightly with the particular vegetable oil or oils employed. On the other hand, all of the blends of the present invention have consistently exhibited slightly higher engine rpm's, i.e. a difference in the range of about 100-200 rpm, when operated under no load conditions with the diesel test engine used in Examples 1-14, compared with No. 2 diesel oil.

We have found no need for the addition to the above blends of other fuel additives or performance modifiers, as the following examples will demonstrate. However, we do not exclude from the scope of this invention the possibility of using such conventional additives in the usual limited amounts in the present fuel compositions for their recognized function.

DESCRIPTION OF EXAMPLES

Examples 1-14—Experimental Tests

In order to test the performance of a variety of different blends of specific vegetable oils, alone and in combination, and specific butyl alcohols, a new one-cylinder Lister LT1 air cooled diesel engine was obtained. This engine was rated at 3600 rpm with regular No. 2 diesel oil. It is equipped with an electric starter and was modified by the addition of two meters for purposes of this series of tests. These were: a standard ±60 ampere meter connected electrically to the output of the generator to detect any variation in electrical output and an 80 psi oil pressure gauge connected to the lubrication system to detect any oil pressure changes due to leakage of the fuel from the cylinders. In addition, a standard hand-held SW 0 to 4000 rpm tachometer having a rubber rotary tip for manual engagement with the flywheel of the engine was used to observe engine speed.

To simplify the changeover from one fuel blend to another without the need for time-consuming cleaning, the regular fuel tank of the invention was disabled by disconnecting the fuel line extending therefrom at the fuel pump and adding a separate clear plastic fuel tube connected to the inlet of the fuel pump. A 10 oz aluminum cup-shaped funnel emptied into the other end of the added plastic fuel line, the length of the line being sufficient to permit the funnel to be located at a point above the fuel pump inlet so that the fuel would flow to the pump under gravity as is normal for this engine.

For each test, the decompression lever of the Lister engine was moved clockwise to its "opening" position to relieve compression within the engine and the fuel pump priming screw was opened to bleed the line. The funnel was filled with 8 oz of a selected fuel blend and the fuel was allowed to flow by gravity feed into the fuel pump. The crank handle of the engine was slowly turned manually clockwise in order to prime the combustion chamber and remove any air from the fuel system. This engine is designed to emit an audible metallic clicking sound when priming is complete, and cranking was stopped when that sound was heard. The crank handle was then removed and the fuel pump priming screw closed. The decompression lever was then shifted to its "operating" position, and the engine control lever was displaced clockwise to its starting position at which extra fuel is delivered to the combustion chamber. The electric starter button was engaged to start the engine, and after the engine had fired, the control lever was turned to its middle "running" position.

As soon as the engine was operating stably, the rpm of the flywheel was checked by placing the rubber tip of the hand-held tachometer into contact with the flywheel shaft under moderate hand pressure and the reading of the tachometer noted. The guages for the oil pressure and ampere output were observed. Readings on the tachometer and oil and ampere gauges were checked at starting, every two minutes thereafter, and immediately prior to stopping. At the conclusion of each test, extending from about 10-20 minutes, the engine was stopped by displacing the control lever to its stop position. The majority of tests were repeated several times to confirm the initial observations. When the fuel blend was to be changed, the fuel pump priming screw was opened and the aluminum funnel lowered to a point below the height of the engine fuel pump to cause all remaining fuel to be drained out of the fuel system under gravity. After the fuel had been removed from the engine in this way, the funnel was returned to its superior position, filled with 8 oz of the next fuel blend to be tested and the procedure repeated.

In all of the tests, the ampere meter registered a normal zero output throughout, while the oil pressure gauge registered a normal reading of 1.03 bar (equal to 15 lbf/in$^2$), without variation. Different tachometer readings were obtained, as noted in the following tabulation which represents the results for the indicated blends tested for mixtures of 25%, 50% and 75% of the specified oil and 75%, 50% and 25% of the indicated butyl alcohol, respectively.
1. 25–75% Corn oil; 75–25% n-butanol
   Tachometer reading—3700 rpm.
2. 25–75% Sunflower seed oil; 75–25% n-butanol
   Tachometer reading—3700 rpm.
3. 25–75% Vegetable[1] oil; 75–25% n-butanol
   Tachometer reading—3700 rpm.
4. 25–75% Peanut oil; 75–25% n-butanol
   Tachometer reading—3700 rpm.
5. 25–75% Soybean oil; 75–25% n-butanol
   Tachometer reading—3700 rpm.
6. 25–75% Linseed oil; 75–25% n-butanol
   Tachometer reading—3700 rpm.
7. 25–75% Cottonseed oil; 75–25% n-butanol
   Tachometer reading—3700 rpm.
8. 25–75% Corn oil; 75–25% Iso-butanol
   Tachometer reading—3700–3800 rpm.
9. 25–75% Sunflower seed oil; 75–25% Iso-butanol
   Tachometer reading—3700–3800 rpm.
10. 25–75% Vegetable oil[1] oil; 75–25% Iso-butanol
    Tachometer reading—3700–3800 rpm.
11. 25–75% Peanut oil; 75–25% Iso-butanol
    Tachometer reading—3700–3800 rpm.
12. 25–75% Soybean oil; 75–25% Iso-butanol
    Tachometer reading—3700–3800 rpm.
13. 25–75% Linseed oil; 75–25% Iso-butanol
    Tachometer reading—3700–3800 rpm.
14. 25–75% Cottonseed oil; 75–25% Iso-butanol
    Tachometer reading—3700–3800 rpm.

[1] Designates random mixtures in any proportion of corn oil, soybean oil, peanut oil, sunflower seed oil, linseed oil and cottonseed oil.

In all the above tests, the engine ran smoothly with little or no observable exhaust or odor.

Example 15—Practical Tests—Massey-Ferguson Tractors

A fuel composition composed of 50% corn oil and 50% n-butyl alcohol was used as the fuel for two Massey-Ferguson tractors, i.e., an MF245 having a 42 hp Perkins 3-cylinder (152 cu.in) diesel engine and an MF265 with a 60 hp Perkins 4-cylinder (236.cu.in) diesel engine. The engine performance in both tractors and the behavior of the fuel was entirely satisfactory, the engine running smoothly and evenly without significant smoke or odor with quick acceleration and smooth idling. The above blend could be mixed in any proportion to No. 2 diesel oil without significant change in engine performance.

Example 16—Practical Tests—GMC Truck Engine

A mixture of 50% sunflower seed oil and 50% isobutyl alcohol was used as the fuel for an 8-cylinder Detroit diesel GMC Astro 95, 318 hp truck engine. This truck was road tested with the above fuel blend in comparison with No. 2 diesel oil without discernible difference in performance or behavior.

Example 17—Stationary Dynamometer Test

A blend of 50% corn oil and 50% isobutyl alcohol was tested quantitatively for power output at the facility of VPI and SU at Blacksburg, Va. This facility has a Ford 3000 tractor equipped with a 39 hp, 3-cylinder diesel engine mounted in stationary position with a fixed coupling to a dynamometer. The dynamometer reading for the above fuel blend was approximately 6% less than that resulting when the same engine was operated with No. 2 diesel oil. Otherwise there was no difference in engine operating behavior discernible by the observer.

In the course of the aforegoing description, certain variations and modifications of the inventive concept have already been suggested and others may very well occur naturally to those skilled in the art without departure from the spirit of the invention. Consequently, it is not intended that the invention should be limited to the specific embodiments set forth in the above description except as required by the express language of the appended claims.

What is claimed is:

1. A fuel composition for a diesel internal combustion engine which consists essentially of a homogeneous mixture of about 25–75% of a vegetable seed oil which is normally liquid at the ambient operating temperature range of said engine and free of matter which is solid within said range, and about 75–25% of a butyl alcohol, said percentages being by volume.

2. In a method of operating a diesel internal combustion engine, the improvement of supplying to said engine as fuel a homogeneous mixture consisting essentially of about 25–75% of a vegetable oil which is normally liquid at the ambient temperature in which said engine is operated and about 75–25% of a butyl alcohol, said percentages being by volume.

3. The composition of claim 1 wherein the vegetable oil is corn oil, sunflower seed oil, peanut oil, soybean oil, linseed oil or cottonseed oil.

4. The method of claim 2 wherein the vegetable oil is corn oil, sunflower seed oil, peanut oil, soybean oil, linseed oil or cottonseed oil.

5. The composition of claim 1 wherein the mixture contains about 50% of said oil and 50% of said alcohol.

6. The method of claim 2 wherein the mixture contains about 50% of said oil and 50% of said alcohol.

* * * * *